(12) United States Patent
Alkhateeb

(10) Patent No.: US 11,703,084 B2
(45) Date of Patent: Jul. 18, 2023

(54) METHOD AND SYSTEM FOR DYNAMICALLY ADJUSTING BEARING SUPPORT STIFFNESS AND DAMPING

(71) Applicant: SAUDI ARABIAN OIL COMPANY, Dhahran (SA)

(72) Inventor: Eyad Mohammad Alkhateeb, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 540 days.

(21) Appl. No.: 16/881,956

(22) Filed: May 22, 2020

(65) Prior Publication Data
US 2021/0364036 A1 Nov. 25, 2021

(51) Int. Cl.
| | | |
|---|---|---|
| *H02K 5/16* | (2006.01) | |
| *F16C 27/04* | (2006.01) | |
| *F16F 7/08* | (2006.01) | |

(52) U.S. Cl.
CPC .............. *F16C 27/04* (2013.01); *F16F 7/082* (2013.01); *F16F 2228/066* (2013.01); *F16F 2230/18* (2013.01)

(58) Field of Classification Search
CPC .................... F16C 27/04; F16C 19/527; F16F 2228/066; F16F 2230/18; F16F 1/387; F16F 1/3842
USPC ....... 188/267, 267.1, 267.2; 310/51, 156.74; 318/611
See application file for complete search history.

(56) References Cited

U.S. PATENT DOCUMENTS

| | | | |
|---|---|---|---|
| 4,514,458 A | * | 4/1985 | Thorn ..................... F16F 1/362 428/605 |
| 5,319,275 A | | 6/1994 | Tozoni |
| 5,603,574 A | | 2/1997 | Ide et al. |
| 5,641,152 A | | 6/1997 | Angles et al. |
| 6,191,515 B1 | | 2/2001 | Post |
| 7,296,654 B1 | | 11/2007 | Berman |

(Continued)

FOREIGN PATENT DOCUMENTS

| | | |
|---|---|---|
| CN | 103511554 A | 1/2014 |
| CN | 105443857 A | 3/2016 |

(Continued)

OTHER PUBLICATIONS

Choudhry V. V.; "Experimental Evaluation of Wire Mesh For Design as a Bearing Damper;" A Thesis by Vivek Vaibhav Choudhry, B.S., Regional Engineering College; Allahabad, India; Aug. 2004 (98 pages).

(Continued)

*Primary Examiner* — Christopher P Schwartz
(74) *Attorney, Agent, or Firm* — Osha Bergman Watanabe & Burton LLP

(57) ABSTRACT

A bearing support system includes a bearing disposed within a bearing housing. A bearing damper is disposed around the bearing and includes one or more knitted mesh pads. A compression ring is positioned to be movable relative to the bearing housing and to apply a compression to the bearing damper that results in a change in at least one of a length and a wall thickness of each knitted wire mesh pad and a corresponding change in the stiffness and bearing of the damper. The system supports rotation of a shaft and may include one or more sensors to measure vibrations in the shaft and a controller to control movement of the compression ring in response to the mechanical vibrations.

16 Claims, 13 Drawing Sheets

(56) References Cited

U.S. PATENT DOCUMENTS

| | | | |
|---|---|---|---|
| 7,892,630 B1* | 2/2011 | McKnight | B64C 3/26 |
| | | | 428/114 |
| 9,494,048 B1 | 11/2016 | Parnin | |
| 9,812,922 B2 | 11/2017 | Permuy | |
| 10,050,579 B2* | 8/2018 | Bauer | H02K 5/16 |
| 10,801,366 B2* | 10/2020 | Ganiger | F16C 35/042 |
| 2003/0218284 A1 | 11/2003 | Kato et al. | |
| 2010/0204881 A1 | 8/2010 | Muragishi et al. | |
| 2014/0027222 A1 | 1/2014 | Martinsons | |
| 2015/0369326 A1* | 12/2015 | Modrezejewski | F16F 13/30 |
| | | | 188/267.1 |
| 2016/0053465 A1 | 2/2016 | Kuirinlahti | |
| 2017/0051818 A1* | 2/2017 | Ebke | F16D 47/02 |
| 2018/0180131 A1 | 6/2018 | Inoue | |

FOREIGN PATENT DOCUMENTS

| | | | | |
|---|---|---|---|---|
| CN | 108253058 A | * | 7/2018 | F16F 1/3842 |
| CN | 108266479 A | | 7/2018 | |
| CN | 110361172 A | | 10/2019 | |
| EP | 2899414 A1 | | 7/2015 | |
| FR | 2812360 B1 | | 5/2007 | |
| GB | 2331132 B | | 7/2002 | |
| JP | 2012076513 A | | 4/2012 | |
| RU | 2654890 C1 | | 5/2018 | |
| WO | 2005/095819 A1 | | 10/2005 | |
| WO | 2007/066527 A1 | | 6/2007 | |

OTHER PUBLICATIONS

Jones A.M.; "Experimental Examination of Wire Mesh Dampers Subjected to Large Amplitude Displacements;" A Thesis by Adam Matthew Jones, B.S., Texas A&M University; Aug. 2007 (44 pages).

International Search Report and Written Opinion issued in corresponding International Patent Application No. PCT/US2020/038924, dated Feb. 15, 2021 (13 pages).

* cited by examiner

METHOD AND SYSTEM FOR DYNAMICALLY ADJUSTING BEARING SUPPORT STIFFNESS AND DAMPING

BACKGROUND

Machines that employ rotating shafts supported on bearings are commonly found in critical functions in industrial plants. Examples of such machines are pumps, compressors, turbines, and engines. During operation, mechanical vibrations can occur in these machines for various reasons, such as load imbalance, turbulence, fluid-structure interactions, dynamic instability, cavitation, fluid forces, shaft misalignment, component wear, loose bearings, and the like. These vibrations could cause mechanical deterioration, rubbing, and fatigue failures. Moreover, when vibration levels exceed acceptable limits, the machine would be shut down for investigation and correction. This sudden shutdown period may cause significant loss of valuable production in addition to repair and manpower costs.

SUMMARY

A bearing support system includes a bearing housing, a bearing disposed within the bearing housing to receive and support rotation of a shaft about an axial axis, and a bearing damper disposed around the bearing. The bearing damper comprises a knitted wire mesh pad having a length in an axial direction that is parallel to the axial axis and a wall thickness in a radial direction that is transverse to the axial axis. The bearing support system also includes a compression ring positioned to be movable relative to the bearing housing in the axial direction such that a movement of the compression ring in the axial direction applies a compression to the bearing damper. The compression applied to the bearing damper results in a change in at least one of the length and wall thickness of the knitted wire mesh pad and a corresponding change in a stiffness and a damping of the bearing damper. The system may include an actuator coupled to the compression ring and controllable to move the compression ring in the axial direction in response to mechanical vibrations in an environment of the bearing damper. The system may include an anti-rotation ring disposed between the compression ring and the bearing damper and anti-rotatably engaging the bearing housing. The movement of the compression ring in the axial direction may result in a movement of the anti-rotation ring in the axial direction. The system may include a structural support coupled to the bearing housing. The structural support may have a support wall disposed at least partially within the bearing housing such that an annular space is defined between the support wall and the bearing housing. The bearing may be disposed at a first side of the support wall, the bearing damper may be disposed at a second side of the support wall in a first portion of the annular space, and the compression ring may be disposed in a second portion of the annular space. The compression ring may be in threaded engagement with the bearing housing. The compression ring may be movable in the axial direction by adjustment of the threaded engagement. The system may include a shoulder formed on at least one of the support wall and the bearing housing. The bearing damper may be constrained between the shoulder and the anti-rotation ring. The actuator coupled to the compression ring may be a worm drive. The worm drive may comprise a worm gear that is coupled to the compression ring and a worm screw that meshes with the worm gear. The system may include a split wedge ring disposed between the anti-rotation ring and the bearing damper to apply a compression to the bearing damper in the radial direction in response to movement of the compression ring in the axial direction. The system may include at least one vibration sensor positioned to sense the mechanical vibrations in the environment of the bearing damper. The at least one vibration sensor may be coupled to the bearing housing or to the shaft. The system may include a controller in communication with the at least one vibration sensor. The controller may receive an output of the at least one vibration sensor and control the actuator to move the compression ring in the axial direction based on the output of the at least one vibration sensor. The knitted wire mesh pad may be made of one or more wires, each wire including a metal or an alloy.

A method of supporting rotation of a shaft in a machine includes providing a bearing within a bearing housing and disposing a bearing damper around the bearing. The bearing damper comprises a knitted wire mesh pad having a length in an axial direction that is parallel to an axial axis and a wall thickness in a radial direction that is transverse to the axial axis. The method includes receiving and supporting a shaft in the bearing, rotating the shaft about the axial axis, measuring vibrations in an environment of the damper during rotation of the shaft, and applying compression to the bearing damper to adjust at least one of the length and wall thickness of the bearing damper based on the measured vibrations. The act of applying compression to the bearing damper may include moving a compression ring relative to the bearing housing in the axial direction. The act of applying compression to the bearing damper may include determining an amount by which to adjust at least one of the axial length and the wall thickness of the knitted wire mesh pad based on the measured vibrations. The act of applying compression to the bearing damper may include determining a change in the measured vibrations over a time period and applying the compression if the change in measured vibrations over the time period exceeds a threshold. The act of moving the compression ring relative to the bearing housing in the axial direction may include controlling an actuator to move the compression ring in the axial direction. The act of applying compression to the bearing damper based on the measured vibrations may include transferring movement of the compression ring in the axial direction to an anti-rotation ring that is in abutting relation with the knitted wire mesh pad. The act of applying compression to the bearing damper based on the measured vibrations may include applying compression to the knitted wire mesh pad along the axial direction and the radial direction.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
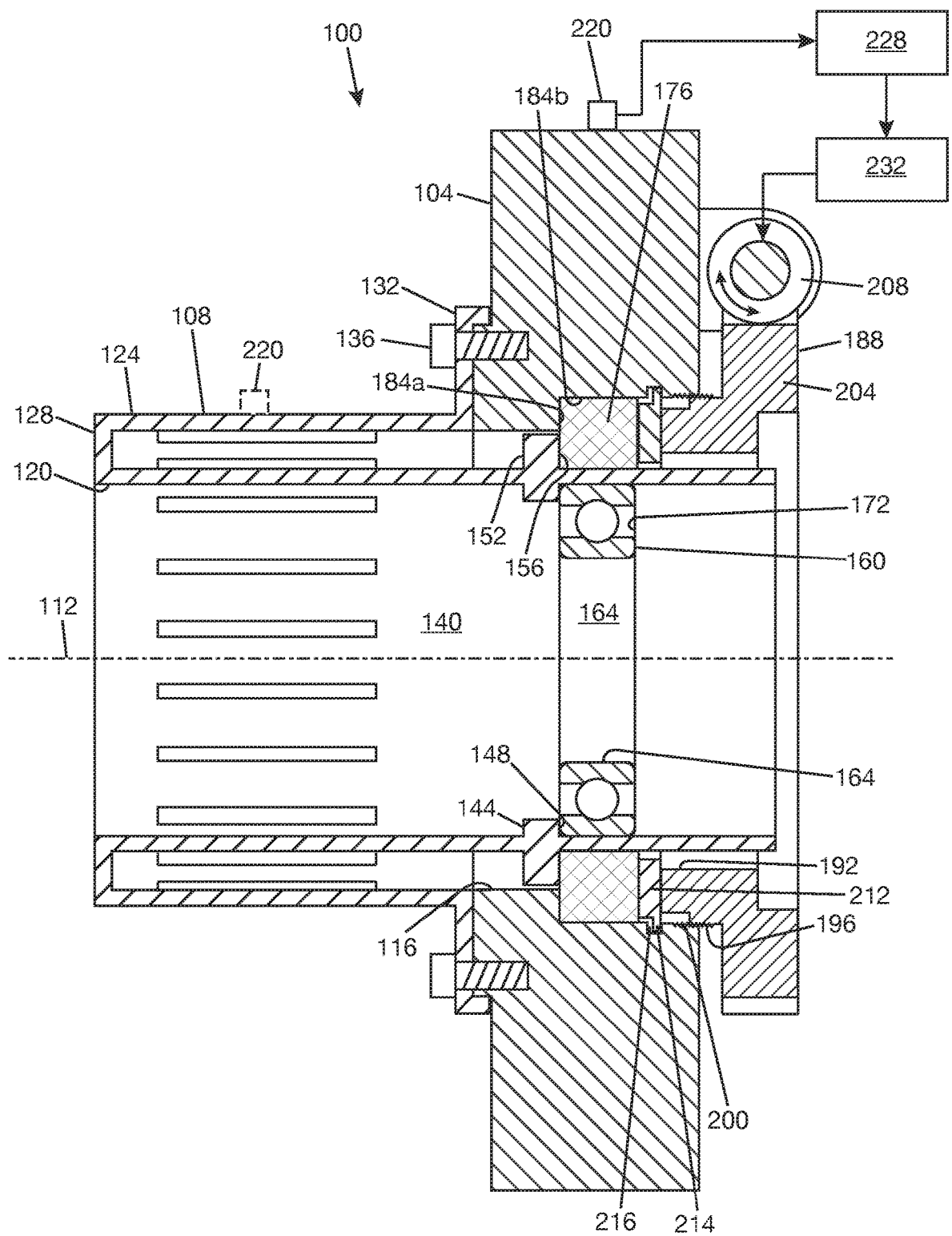
FIG. 1 is cross-section of a bearing support system according to one illustrative implementation.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with bearing support systems have not been shown or described in detail to avoid unnecessarily obscuring descriptions of the implementations and embodiments. For the sake of continuity, and in the interest of conciseness, same or similar reference characters may be used for same or similar objects in multiple figures.

FIG. 1 shows an exemplary bearing support system 100 that may be used to support rotation of a shaft about an axial axis 112. System 100 includes a bearing housing 104 and a structural support 108. Bearing housing 104 and structural support 108 may be part of a machine. Bearing housing 104 and structural support 108 may have a common axial axis, which may be aligned with axial axis 112. Structural support 108 has an inner support wall 120 and an outer support wall 124. Each of inner support wall 120 and outer support wall 124 may be generally cylindrical in shape. Outer support wall 124 circumscribes a portion of inner support wall 120 and is radially spaced apart from inner support wall 120. One end of inner support wall 120 is joined to one end of outer support wall 124 by an end wall 128. The other end of outer support wall 124 that is not joined to end wall 128 terminates in an annular flange 132. Annular flange 132 may be secured to bearing housing 104 by any suitable means, such as by bolts 136. A portion of inner support wall 120 extends into and through a central bore 116 of bearing housing 104. An inner collar 144 is formed on an inner surface of inner support wall 120. Inner collar 144 provides a shoulder 148. An outer collar 152 may be formed on an outer surface of inner support wall 120. In one implementation, outer collar 152 is disposed radially of inner collar 144, with inner support wall 120 serving as a separating wall between outer collar 152 and inner collar 144. Outer collar 152 provides a shoulder 156.

Figure 2:
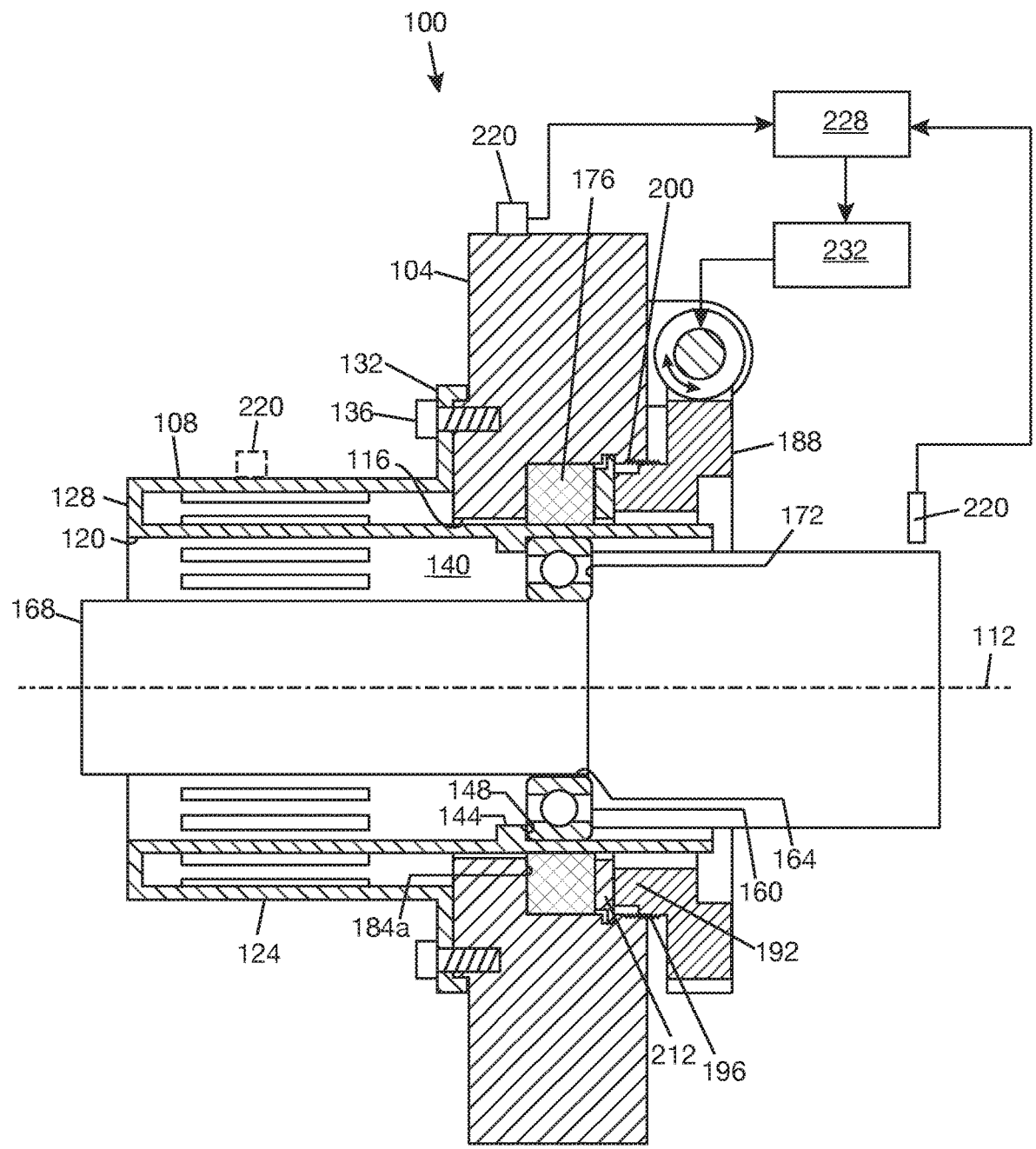
FIG. 2 shows a shaft fitted into a bearing of the bearing support system of FIG. 1.

System 100 includes a bearing 160 disposed inside a central passage 140 defined by inner support wall 120. Bearing 160 is illustrated as a rolling-element bearing, such as a ball bearing. However, other types of bearings may be used in the system. In one implementation, bearing 160 is disposed inside central passage 140 such that one end of bearing 160 abuts shoulder 148 provided by inner collar 144 of inner support wall 120. Bearing 160 includes a hole 164 to receive a shaft that is to be rotated about axial axis 112. FIG. 2 shows a shaft 168 fitted in hole 164 for illustration purposes. In FIG. 2, bearing 160 circumscribes a portion of shaft 168 and thereby separates shaft 168 from inner support wall 120. Bearing 160 supports shaft loads during rotation of shaft 168 about axial axis 112. In one implementation, shaft 168 is a stepped shaft including a shoulder 172. In this implementation, the other end of bearing 160 that is not in contact with support wall shoulder 148 abuts shaft shoulder 172 such that bearing 160 is retained between support wall shoulder 148 and shaft shoulder 172.

Returning to FIG. 1, system 100 includes a bearing damper 176 arranged on the outer surface of inner support wall 120 and in an annular space defined between opposing surfaces of inner support wall 120 and bearing housing 104. One end surface of bearing damper 176 abuts shoulder 184a in bearing housing 104 and shoulder 156 on support wall 120. Shoulder 184a of bearing housing 104 is aligned with shoulder 156a of support wall 120 to form a constraining wall for bearing damper 176 at one end. (In some cases, shoulder 156 on support wall 120 may be omitted, and the end surface of bearing damper 176 may abut only shoulder 184a in bearing housing as shown in FIG. 2.) A circumferential surface of bearing damper 176 abuts an inner wall 184b of bearing housing 104. In one implementation, bearing damper 176 is used to absorb vibrations in the system and prevent damage to bearing 160. In one implementation, bearing damper 176 is a wire mesh vibration damper including one or more knitted wire mesh pads (not identified separately). The knitted wire mesh pad is made by knitting a single wire or multiple wires to form a flexible wire mesh of interlocking loops. The knitting can be similar to techniques used to knit yarn. The resulting knitted wire mesh is formed into a desired shape with a hole in the center to allow the knitted wire mesh to be fitted around a tubular structure. The wires can be round or flat. The material of the wire may be a metal or an alloy, such as stainless steel, copper, steel, an aluminum alloy, or some combination thereof.

Figure 3A:
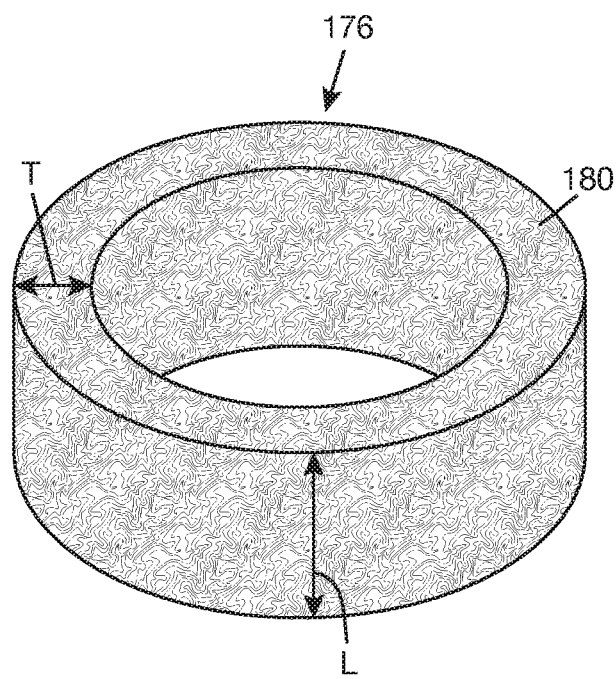
FIG. 3A is a perspective view of a bearing damper including a knitted wire mesh pad.

FIG. 3A shows bearing damper 176 with one knitted wire mesh pad 180 having a ring shape, an axial length L, and a wall thickness T. When bearing damper 176 is in bearing support system 100 as shown in FIG. 1, the axial length L of knitted wire mesh pad 180 will be in a direction that is parallel to axial axis 112. Wall thickness T may be in a radial direction that is transverse to axial axis 112. FIG. 3A shows knitted wire mesh pad 180 with a straight wall. In some cases, knitted wire mesh pad 180 may have a tapered wall. Wall thickness T may be uniform or non-uniform along the circumference of the ring shape. In the configuration where bearing damper 176 has one knitted wire mesh pad 180, the axial length of the bearing damper is the same as the axial length L of the knitted wire mesh pad 180.

Figure 3B:
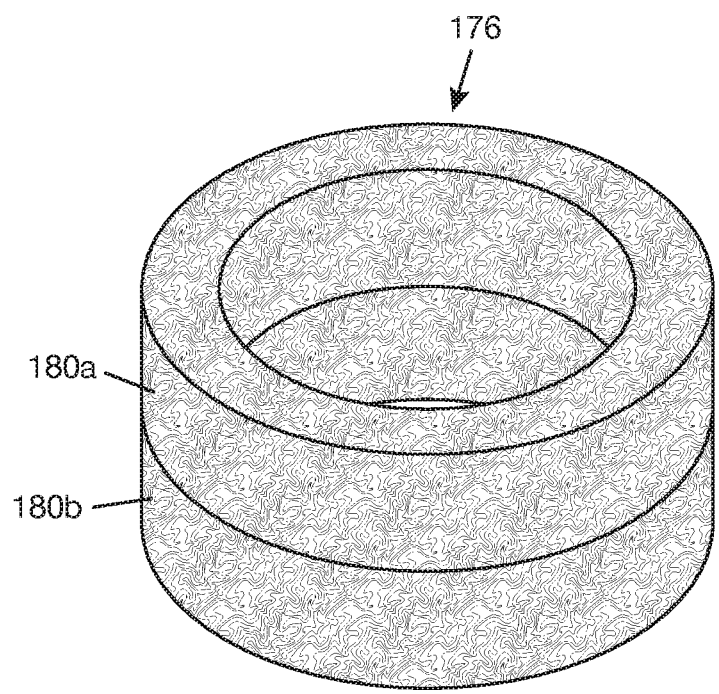
FIG. 3B is a perspective view of a bearing damper including multiple knitted wire mesh pads.

FIG. 3B shows bearing damper 176 with multiple knitted wire mesh pads, e.g., knitted wire mesh pads 180a, 180b, arranged in a stack. Each of knitted wire mesh pads 180a, 180b has an axial length L and a wall thickness T as described for knitted wire mesh pad 180 in FIG. 3A. The axial lengths of the knitted wire mesh pads in a stack may be the same or may be different. The wall thicknesses of the knitted wire mesh pads in a stack may be the same or may be different. In the configuration where bearing damper 176 has multiple knitted wire mesh pads, e.g., mesh pads 180a, 180b, in a stack, the axial length of the bearing damper is equal to a sum of the axial lengths of the knitted wire mesh pads in the stack.

Figure 3C:
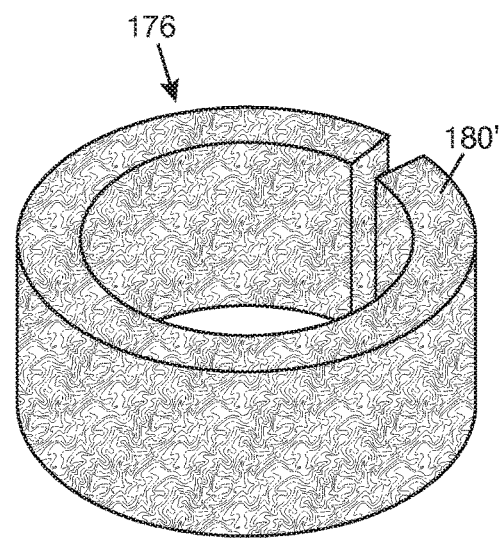
FIG. 3C is a perspective view of a bearing damper including a knitted wire mesh pad having a split ring shape.
Figure 3D:
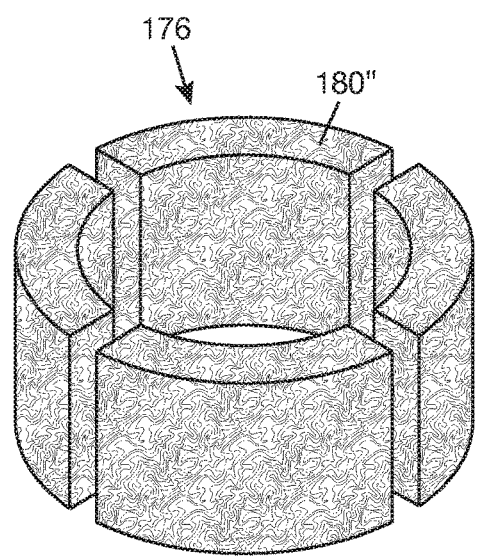
FIG. 3D is a perspective view of a bearing damper including knitted wire mesh pad segments arranged to form a ring shape.
Figure 3E:
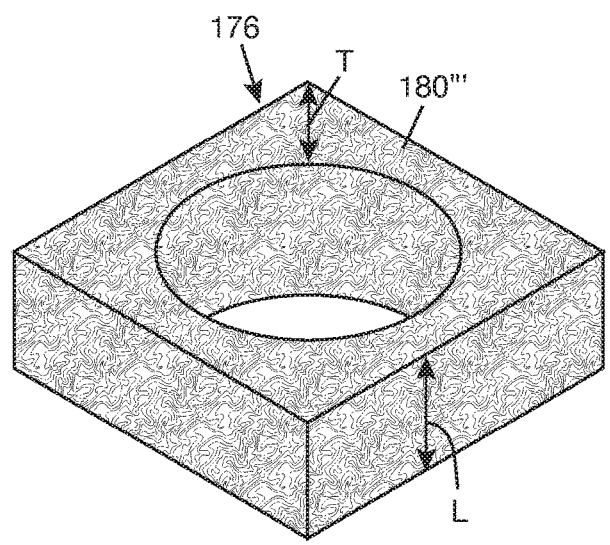
FIG. 3E is a perspective view of a bearing damper including a knitted wire mesh pad with a square shape.

The term "ring shape" as used with knitted wire mesh pad(s) may encompass a continuous ring shape that defines a circular hole in the middle as shown for knitted wire mesh pad 180 in FIG. 3A, a split ring shape that defines a circular hole in the middle as shown for knitted wire mesh pad 180' in FIG. 3C, and ring segments arranged to form a ring shape that defines a circular hole as shown for knitted wire mesh pad 180" in FIG. 3D. However, bearing damper 176 is not limited to knitted wire mesh pads having circular ring shapes. For example, FIG. 3E shows an example where bearing damper 176 includes a knitted wire mesh pad 180''' having a square shape that defines a circular hole in the middle.

In one implementation, the dimension of the hole in the middle of the knitted wire mesh pad(s) may be selected so that bearing damper 176 can fit around support wall 120 as shown in FIGS. 1 and 2. Also, the outer dimension of the knitted wire mesh pad(s) may be selected so that bearing damper 176 contacts both support wall 120 and bearing housing 104 as shown in FIGS. 1 and 2.

The knitted wire mesh pad (180 in FIGS. 3A-3E) acts as a spring when subjected to compressive stress. The knitted wire mesh pad can be deformed along the axial length L direction and along the wall thickness T. In one example, the knitted wire mesh pad may have an initial axial length $L_0$ and an initial wall thickness $T_0$ prior to use in the system (100 in FIGS. 1 and 2). Axial compression can be applied to knitted wire mesh pad 180, which would result in a decrease in the axial length from the initial axial length $L_0$. When the axial compression is removed, the wire mesh pad may return to its initial axis length $L_0$. Similarly, radial compression can be applied to the knitted wire mesh pad 180, which would result in a decrease in the wall thickness of the wire mesh pad from the initial wall thickness $T_0$. When the radial compression is removed, the wire mesh pad may return to its initial wall thickness $T_0$.

Figure 4:
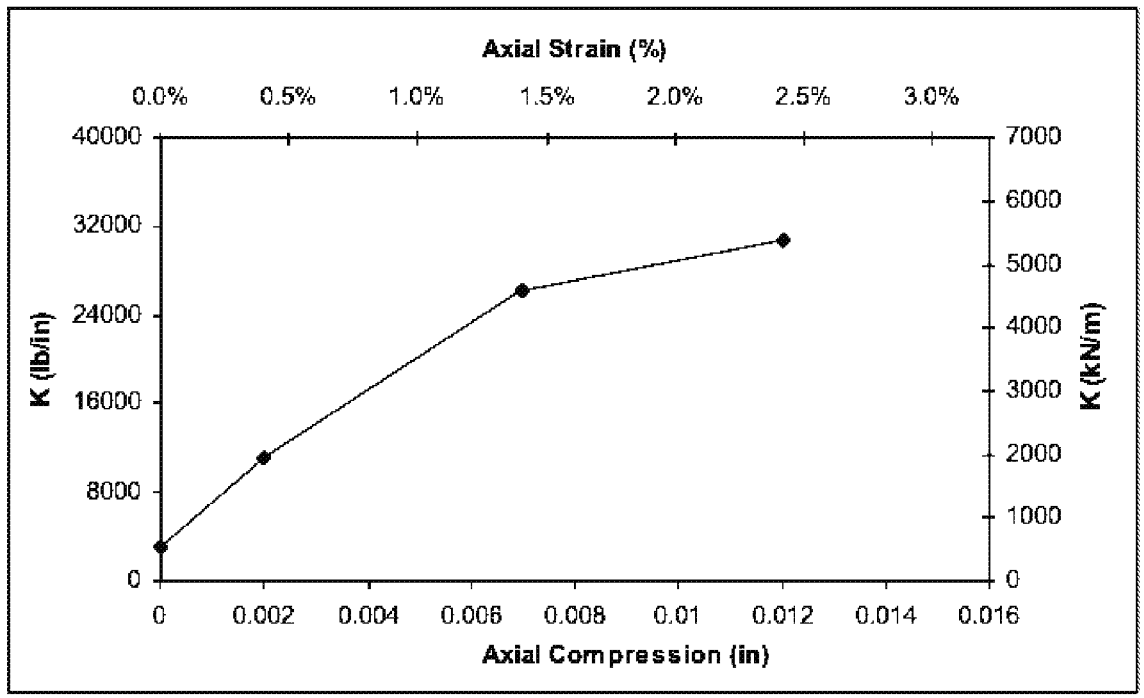
FIG. 4 is a plot showing stiffness as a function of axial compression for a sample knitted wire mesh pad.
Figure 5:
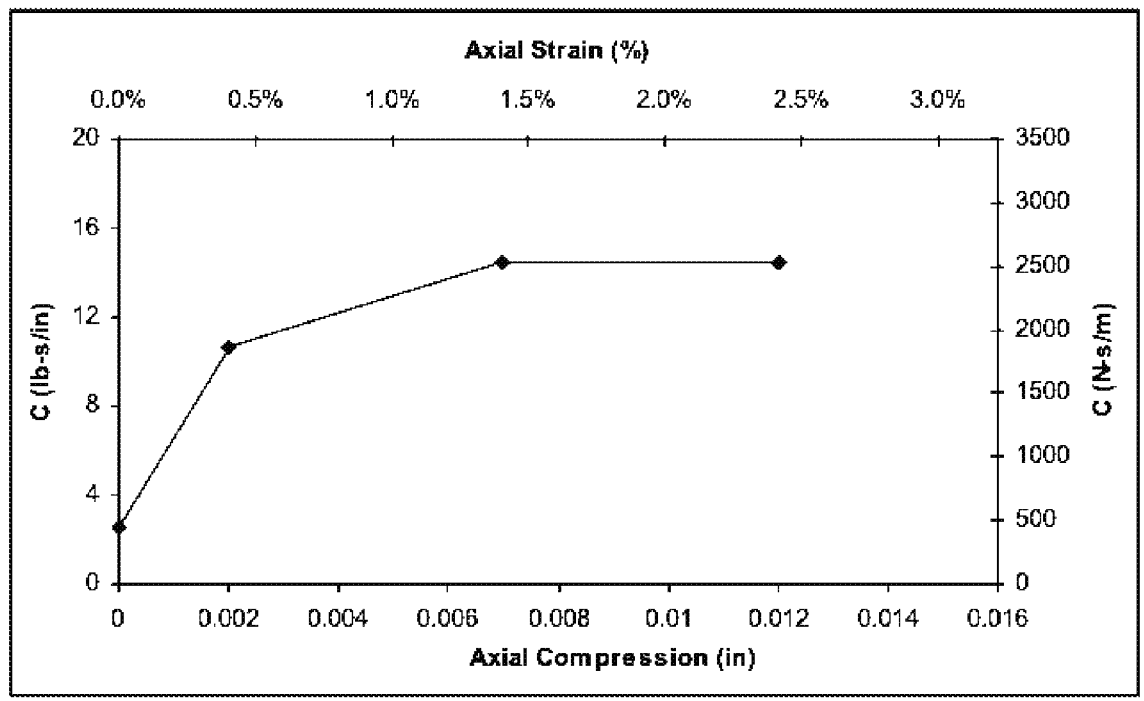
FIG. 5 is a plot showing viscous damping coefficient as a function of axial compression for the sample knitted wire mesh pad of FIG. 4.

The stiffness and damping of bearing damper 176 will generally increase with increasing compression applied to the knitted wire mesh pad(s) in the damper. Stiffness is the extent to which a material resists deformation in response to applied force. Damping is a measure of the ability of a material to suppress mechanical vibrations. Materials with high damping are better able to suppress mechanical vibrations. For illustration purposes, FIG. 4 shows a relationship between axial compression applied to a knitted wire mesh pad and resulting stiffness of the knitted wire mesh pad. The numerical values of the stiffness, axial compression, and axial strain shown in FIG. 4 are not intended to be limiting since these would depend on the configuration of the knitted wire mesh pad. As shown in FIG. 4, stiffness (K) of the knitted wire mesh generally increases as axial compression of the wire mesh increases. FIG. 5 shows a relationship between axial compression and viscous damping coefficient (C) for the example knitted wire mesh pad of FIG. 4. As in the case of FIG. 4, the numerical values shown in FIG. 5 are not intended to be limiting. As shown in FIG. 5, viscous damping coefficient of the knitted wire mesh pad generally increases with increasing axial compression of the knitted wire mesh pad. After a certain threshold, additional increases in axial compression may not result in additional increases in viscous damping coefficient. In the example shown in FIG. 5, viscous damping coefficient is practically constant for axial compression greater than 0.007 inches.

Figure 6:
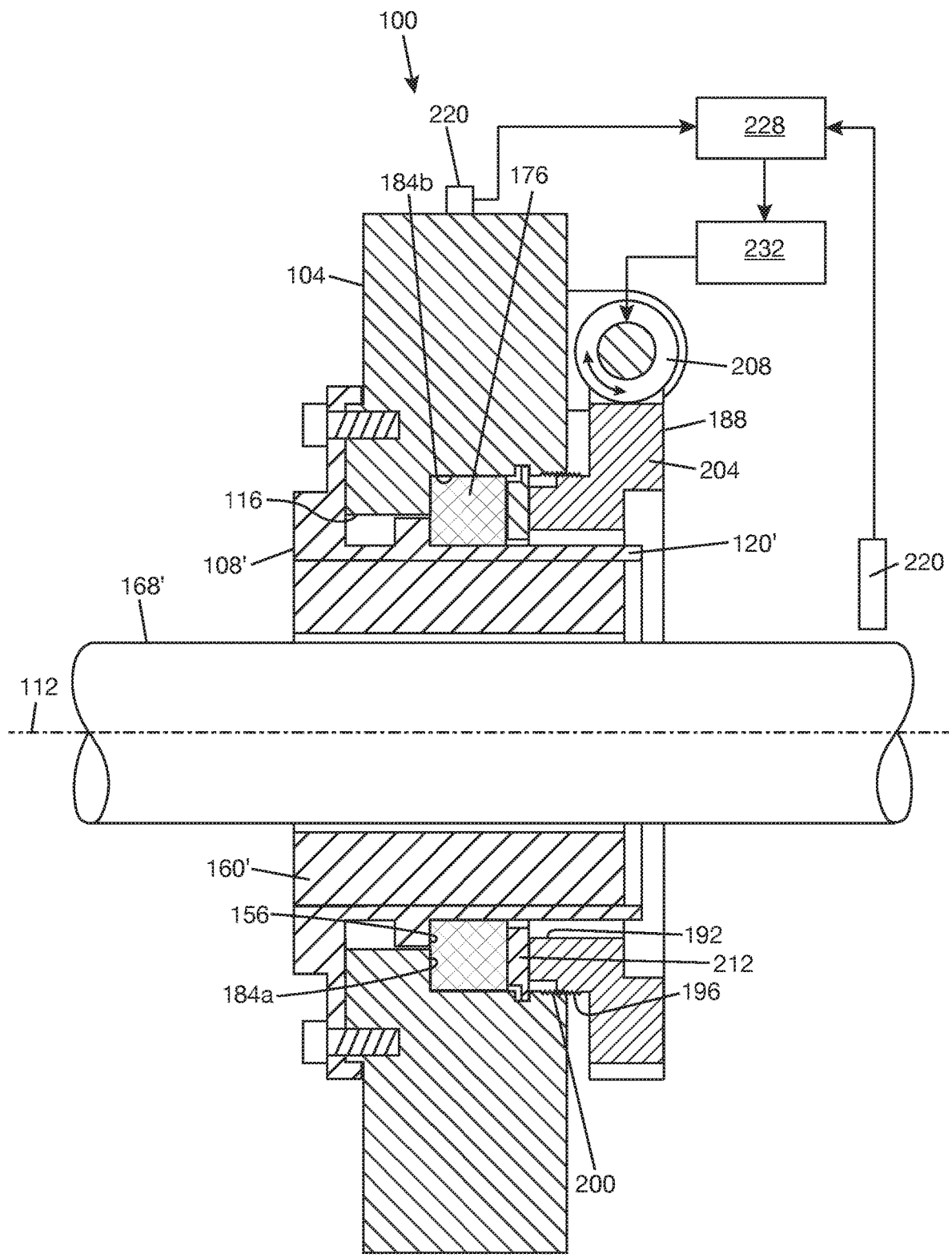
FIG. 6 is a cross-section of a bearing support system with a hydrodynamic bearing according to another illustrative implementation.

In FIGS. 1 and 2, bearing 160 is illustrated as a ball bearing or rolling-element bearing. However, system 100 is not limited to rolling-element bearing, and any type of bearing can be implemented. Other bearing supports or configurations besides what is shown in FIGS. 1 and 2 may also be used. FIG. 6 shows an example where a hydrodynamic bearing 160' may be used to support shaft 168' instead of a rolling-element bearing. Hydrodynamic bearing 160' includes a sleeve having a bore to receive shaft 168' as shown. Lubricant (not shown) is provided in a clearance between the sleeve and shaft to support rotation of the shaft. In the example of FIG. 6, hydrodynamic bearing 160' is disposed inside a central passage defined by an inner surface of a support wall 120' of a structural support 108'. Bearing damper 176 is arranged on an outer surface of support wall 120'. In this arrangement, support wall 120' is between hydrodynamic bearing 160' and bearing damper 176.

Figure 7:
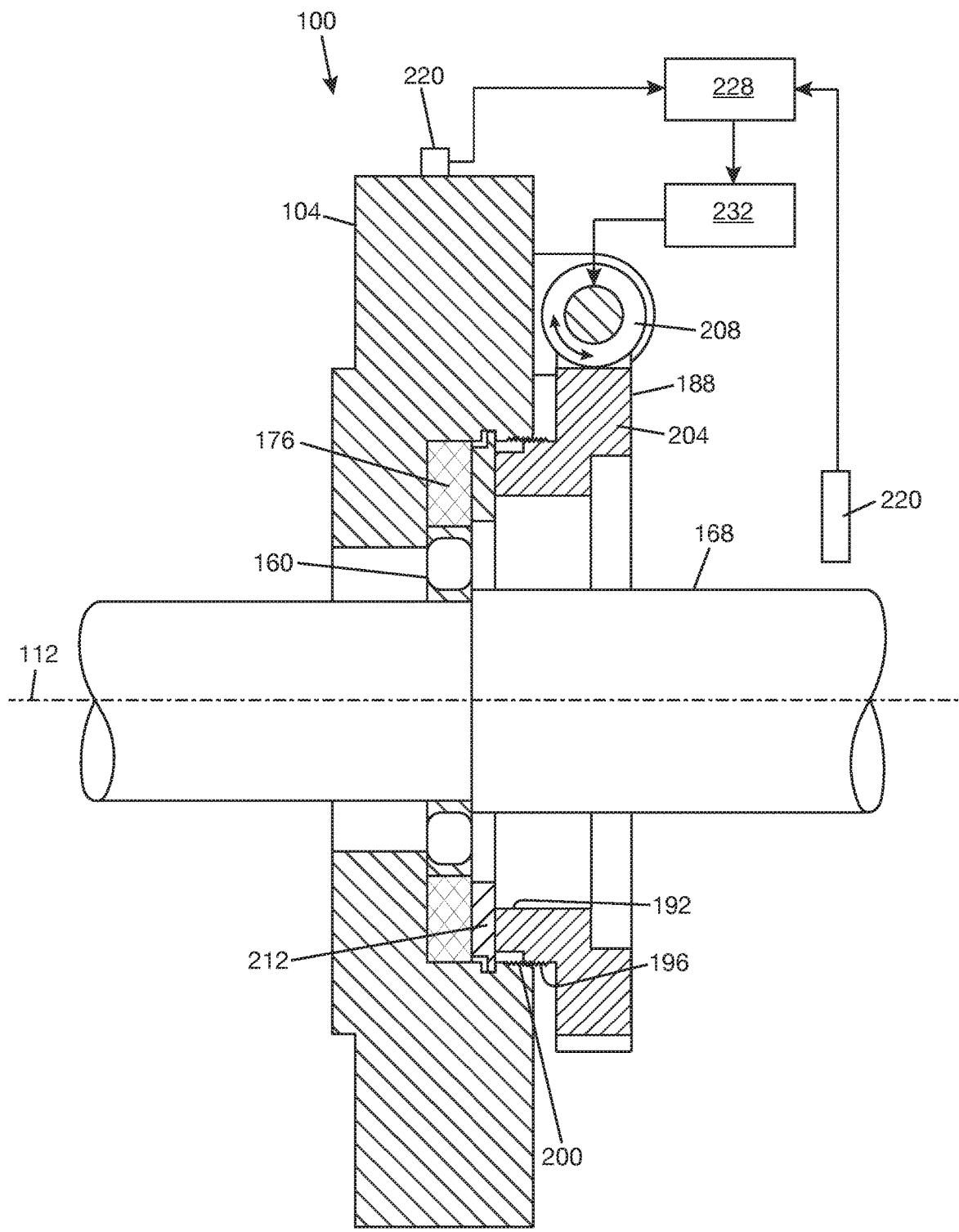
FIG. 7 is a cross-section of a bearing support system illustrating a rolling-element bearing and bearing damper in series according to another illustrative implementation.
Figure 8:
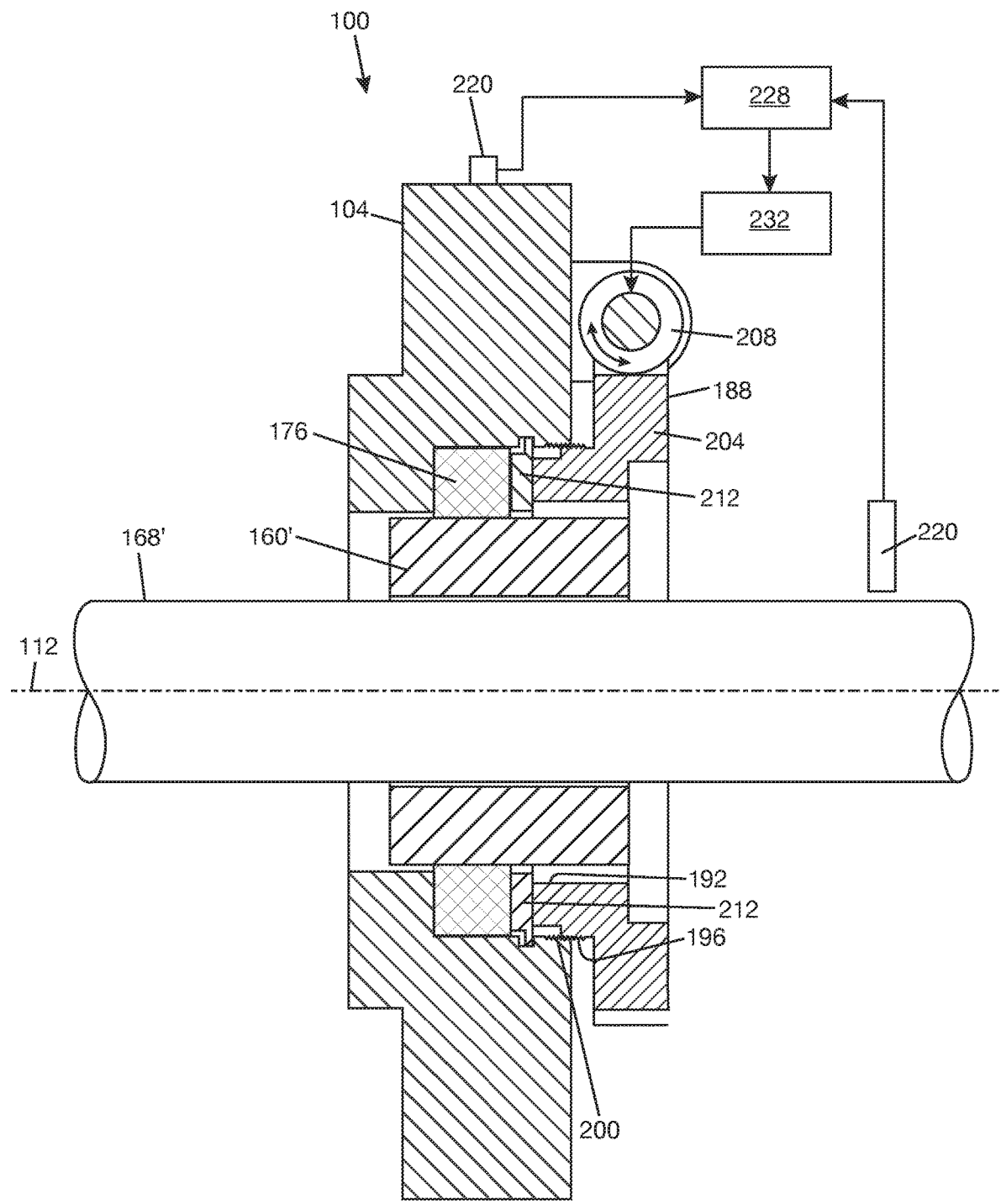
FIG. 8 is a cross-section of a bearing support system illustrating a hydrodynamic bearing and bearing damper in series according to another illustrative implementation.

FIGS. 1 and 2 show a bearing support arrangement where bearing damper 176 is arranged in parallel with bearing 160/structural support 108, i.e., the stiffness and damping of bearing damper 176 are in parallel to the stiffness and damping of bearing 160/structural support 108. Similarly, in FIG. 6, bearing damper 176 is arranged in parallel with bearing 160'/structural support 108', i.e., the stiffness and damping of bearing damper 176 are in parallel to the stiffness and damping of bearing 160'/structural support 108'. FIG. 7 shows an alternative bearing support arrangement where bearing damper 176 is arranged in series with bearing 160. Bearing 160 in FIG. 7 is a rolling-element bearing. Similarly, FIG. 8 shows an alternative bearing support arrangement where bearing damper 176 is arranged in series with bearing 160'. Bearing 160' in FIG. 8 is a hydrodynamic bearing. Arranging bearing and bearing damper in series or in parallel can be applied to any type of bearing.

Returning to FIG. 1, in one implementation, system 100 includes a compression ring 192 that is arranged to apply axial compression to the knitted wire mesh pad(s) of bearing damper 176. Compression ring 192 is arranged in an annular space between inner support wall 120 and bearing housing 104. Compression ring 192 can be actuated to travel along bearing housing 104, where the axial travel of compression ring 192 results in changes in axial compression applied to the knitted wire mesh pad(s) of bearing damper 176. An outer surface of compression ring 192 includes a thread 196 that engages a complementary thread 200 on an inner surface of bearing housing 104. Compression ring 192 travels in an axial direction (that is, along bearing housing 104 and inner support wall 120, or in a direction parallel to axial axis 112) as compression ring 192 is rotated to adjust the threaded engagement between threads 196, 200.

In one implementation, an anti-rotation ring 212 is disposed at the other end surface of bearing damper 176 and in between bearing damper 176 and compression ring 192. In this position, one end of anti-rotation ring 212 abuts bearing damper 176, and the other end of anti-rotation ring 212 abuts compression ring 192. Anti-rotation ring 212 includes a ring with radially projecting tabs 214 on the outer periphery of the ring that fit into respective slots 216 in bearing housing 104. Tabs 214 can move in an axial direction within slots 216, which allows anti-rotation ring 212 to move relative to bearing housing 104 in the axial direction. However, movement of tabs 214 in the circumferential direction is prevented, which also prevents rotation of the bearing damper 176 as the compression ring 192 is rotated. Axial travel of compression ring 192 will result in axial travel of anti-rotation ring 212, which will result in axial compression of the knitted wire mesh pad(s) in bearing damper 176. In addition to preventing rotation, anti-rotation ring 212 allows simple adjustment of the initial axial compression applied to the bearing damper 176 (by using a different thickness anti-rotation ring). Also, anti-rotation ring 212 ensures uniform distribution of compression stress on bearing damper 176 and forms a "sacrificial", easily replaceable low-cost component that protects bearing damper 176 from wear as compression ring 192 rotates.

Figure 9:
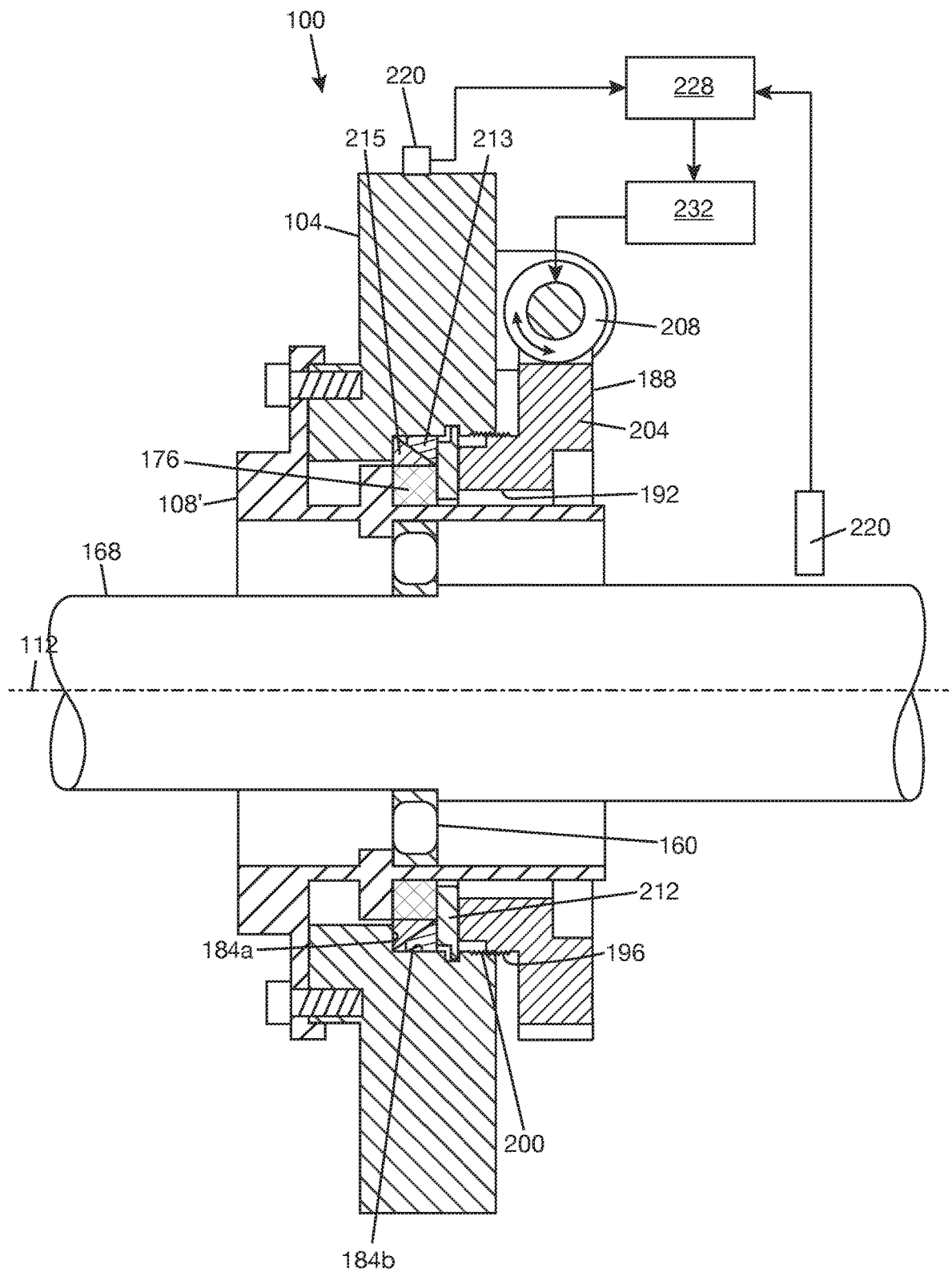
FIG. 9 is a cross-section of a bearing support system illustrating axial compression, with or without radial compression, applied to a bearing damper according to another illustrative implementation.

FIG. 9 shows a bearing support arrangement where radial compression or both radial compression and axial compression can be applied to bearing damper 176 by axial travel of compression ring 192. In FIG. 9, wedge ring 213 and mating wedge ring 215 are disposed between bearing damper 176 and an inner surface of bearing housing 104. Mating wedge ring 215, which is split and sized to allow radial contraction, is disposed between wedge ring 213 and an outer wall surface of bearing damper 176. Each wedge ring is a ring having a tapered surface. In the case of wedge ring 215, the tapered surface is on the outer diameter of the ring. In the case of wedge ring 213, the tapered surface is on the inner diameter of the ring. The tapered surfaces of the wedge structures 213, 215 are in abutting relation. Wedge ring 215 also abuts shoulder 184a in bearing housing 104, while wedge ring 213 abuts an inner wall 184b in bearing housing 104. Anti-rotation ring 212 abuts wedge ring 213 so that axial travel of anti-rotation ring 212 results in axial movement of wedge ring 213 against wedge ring 215. Axial travel of compression ring 192 will result in axial travel of anti-rotation ring 212, which will result in both axial compression of bearing damper 176 and radial displacement of wedge ring 215. Radial displacement of wedge ring 215 will apply a radial compression to bearing damper 176.

Figure 10:
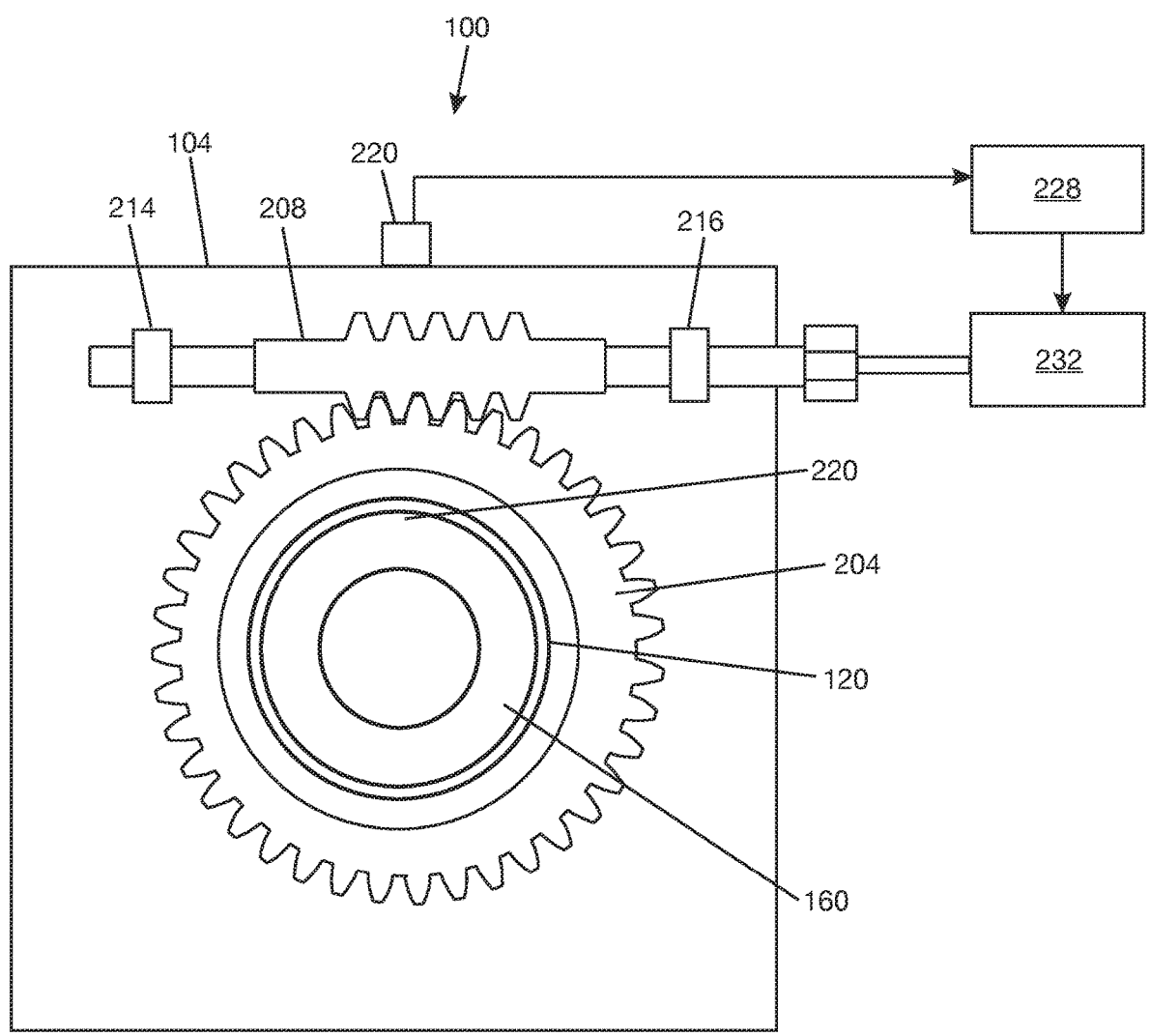
FIG. 10 is an end view of the bearing support system shown in any of FIGS. 1, 2, and 6-9.

Returning to FIGS. 1 and 2, bearing system 100 includes an actuator 188 to drive compression ring 192 in order to apply axial compression to bearing damper 176. In one implementation, actuator 188 includes a worm gear 204 that is disposed at one end of compression ring 192. Worm gear 204 is coupled to (for example, attached to or integrally formed with) compression ring 192 such that rotation of worm gear 204 results in rotation of compression ring 192. Actuator 188 includes a worm screw (also called worm) 208 that is arranged to mesh with worm gear 204. As shown more clearly in FIG. 10, worm screw 208 may be supported by bearing housing 104 in a position to mesh with worm gear 204. As an example, bearing housing 104 may include mounts 214, 216 to support the shaft of worm screw 208. Mounts 214, 216 may include bushings (not shown) to support rotation of the shaft of worm screw 208. Worm gear 204 and worm screw 208 form a worm drive. Worm screw 208 can be rotated in response to measured vibrations in the system. Worm screw 208 will rotate worm gear 204, which will result in rotation of compression ring 192 (in FIGS. 1 and 2) and travel of compression ring 192 in the axial direction. In other implementations, a rotary drive besides a worm drive may be used to rotate compression ring 192.

Referring to FIGS. 1, 2, 6-8, and 10, system 100 may include one or more vibration sensors to measure vibrations in the system, or vibrations in an environment of the bearing damper. In one example, vibration of shaft 168 is measured using one or more vibration sensors 220, which may be, for example, non-contact proximity sensors. Alternatively, or in addition, sensor(s) 220 may be arranged on bearing housing 104 or structural support 108 to measure vibrations. Each vibration sensor 220 may be in communication with a controller 228. Controller 228 may include a driver to receive the output of vibration sensor 220, memory to store data and computer executable instructions, a processor to execute computer executable instructions, and other controller components not specifically mentioned. System 100 may include a motor 232 to rotate worm screw 208. In one implementation, motor 232 is a rotary motor that drives screw 208. In other implementations, the motor could be a linear motor that drives a rack-and-pinion mechanism. Controller 228 may generate control signals for motor 232 in response to the output of vibration sensor 220. Motor 232 may receive control signals from controller 228 and rotate worm screw 208 in order to achieve a desired axial compression (and optionally radial compression) of the knitted wire mesh pad(s) in bearing damper 176.

Figure 11:
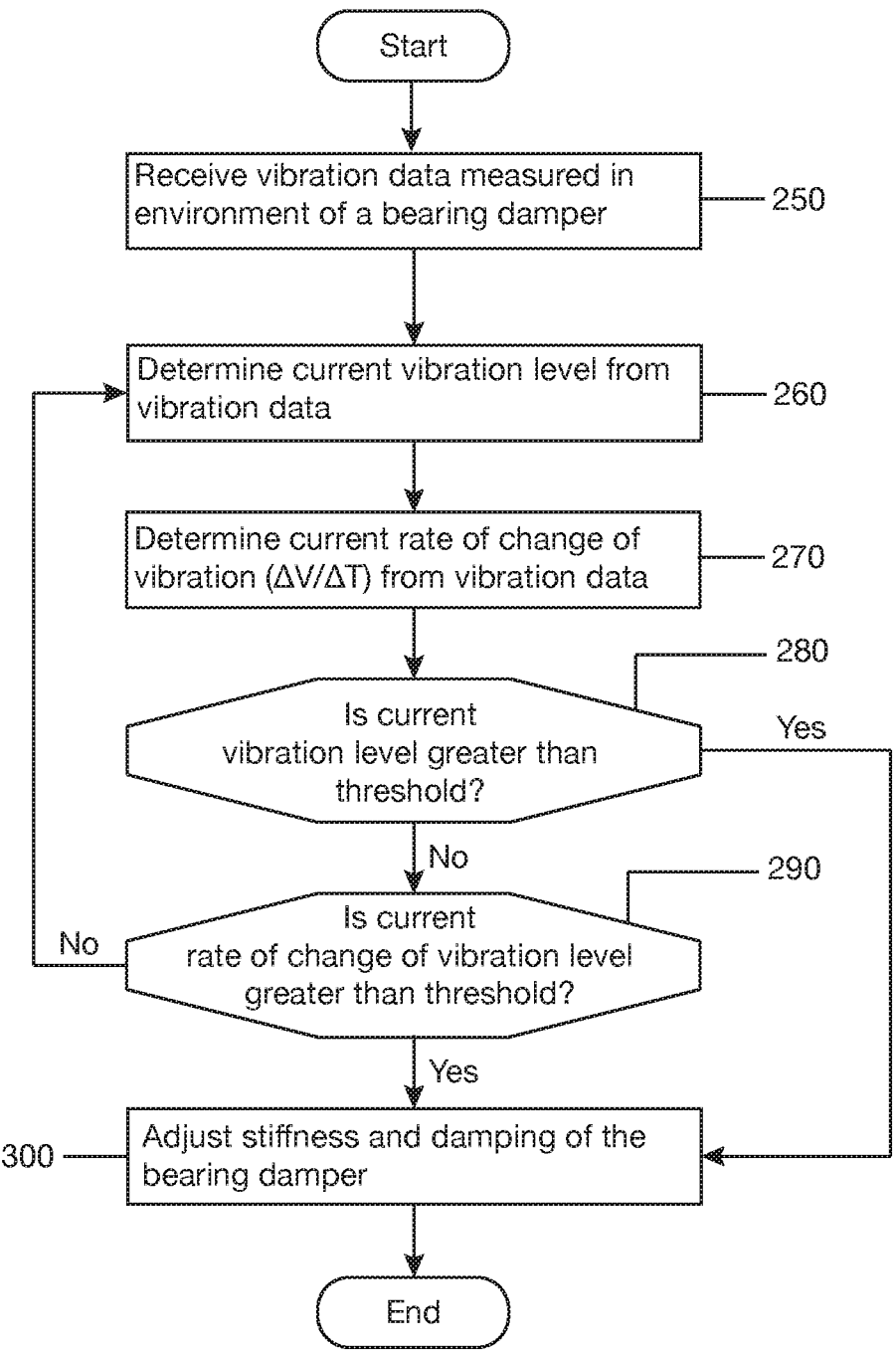
FIG. 11 is a flow diagram showing a method of adjusting stiffness and damping of a bearing damper in the bearing support system of any of FIGS. 1, 2, and 6-9.

FIG. 11 shows an example logic of the controller (228 in FIGS. 2 and 6-10). At 250, vibration data from the vibration sensor(s) (220 in FIGS. 2 and 6-10) are received. The vibration sensor(s) may send data to the controller on a continuous basis. At 260, the current vibration level is determined from the vibration data. At 270, a rate of change of the vibration level is determined. Suppose that the vibration level at a previous time $T_a$ is $V_a$ and the vibration level at a current time $T_b > T_a$ is $V_b$. Then, the rate of change in vibration level can be expressed as $\Delta V/\Delta T = (V_b - V_a)/(T_b - T_a)$. The initial vibration level before adjustment can be set to V0. At 280, the current vibration level is compared to a vibration level threshold set for the system. If the current vibration level is not greater than the vibration level threshold, then at 290, the controller may determine if the rate of change in vibration level is greater than a rate of change threshold set for the system. If the current vibration level is not greater than the vibration level threshold and the rate of change of vibration level is not greater than the rate of change threshold, the controller may return to 260. If the current vibration level is greater than the vibration level threshold or the rate of change in vibration level is greater than the rate of change threshold, then at 300, the controller adjusts the stiffness and damping of the bearing damper (176 in FIGS. 2 and 6-10).

Figure 12:
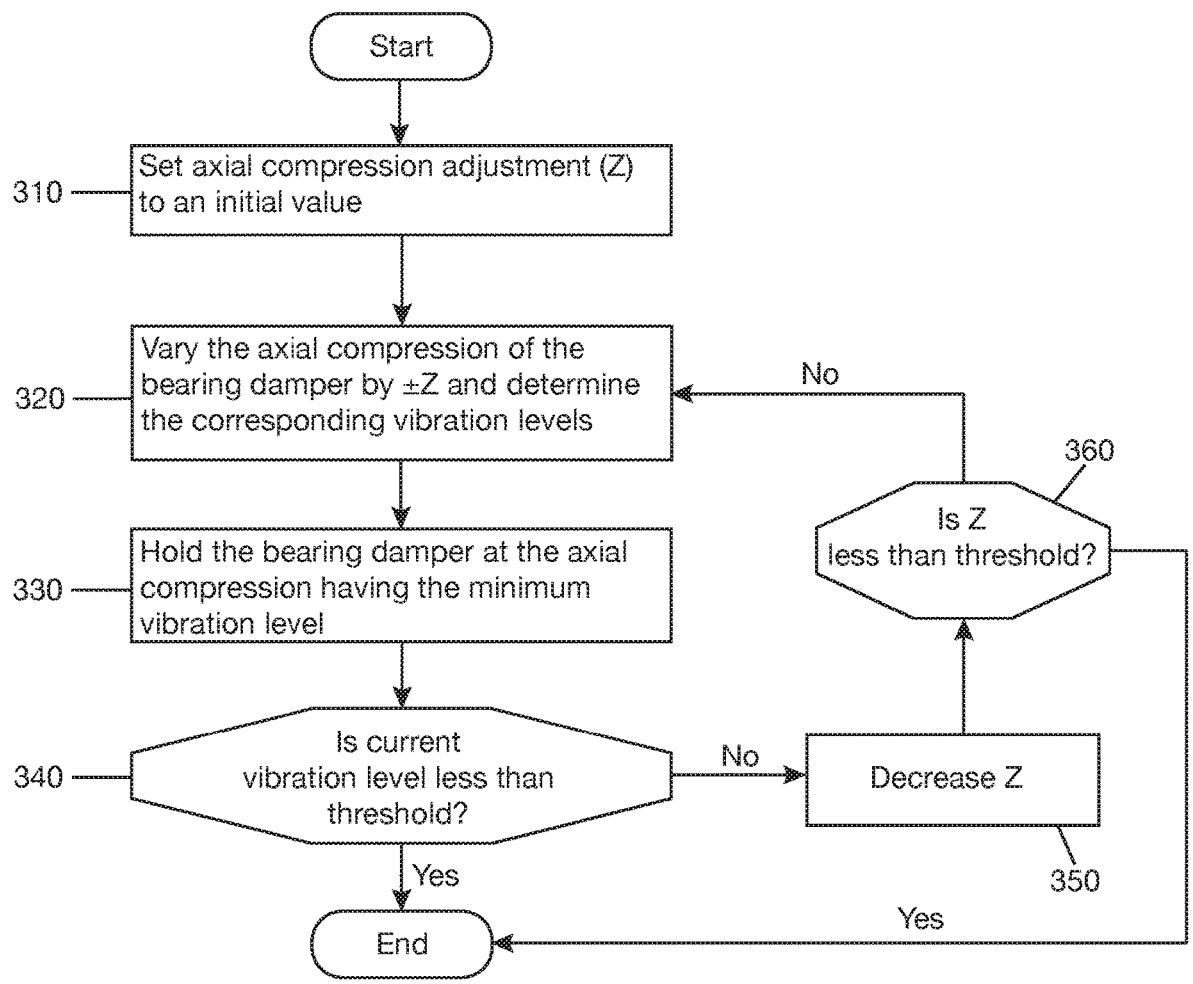
FIG. 12 is a flow diagram showing a continuation of the method of FIG. 11.

FIG. 12 shows an example logic for adjusting the stiffness and damping of the bearing damper. At 310, an axial compression adjustment (Z) to apply to the bearing damper is set to an adjustment threshold. At 320, the axial compression of the bearing damper is varied by ±Z. That is, if the bearing damper has a current axial length of L, a +Z axial compression adjustment is made (that is, L is decreased by Z) and a −Z axial compression adjustment is made (that is, L is increased by Z). The adjustment is made by moving the compression ring (192 in FIGS. 2 and 6-10) in a direction towards the bearing support (+Z adjustment) or in a direction away from the bearing support (−Z adjustment). The vibration level (V1) when the +Z axial compression adjustment is applied is determined from the vibration data received after the adjustment. The vibration level (V2) when the −Z axial compression adjustment is applied is also determined from the vibration data received after the adjustment. Depending on the bearing configuration, the axial compression adjustment may result in an axial compression in the bearing damper or both an axial compression and radial compression in the bearing damper. At 330, the bearing damper is held at the axial compression corresponding to the minimum of the vibration levels V0, V1, and V2. The value of V0 is then set to this new current vibration level. At 340, the controller determines if the current vibration level is less than the vibration level threshold set for the system. If the current vibration level is less than the vibration level threshold, then the adjustment of the stiffness and damping of the bearing damper has been completed. Otherwise, at 350, Z is decreased. For example, Z may be reduced by half. Then, at 360, the controller determines if the value of Z is less than the adjustment threshold. If the value of Z equal to or greater than the adjustment threshold, the controller then returns to 320 with the updated value of Z to adjust the axial compression of the bearing damper.

Referring to FIGS. 1, 2, and 6-9, shaft 168 may be fitted in or received in bearing 160 of system 100. Shaft 168 may be rotated relative to bearing 160 and about axial axis 112 as part of performing a function in a machine. With the machine running and shaft 168 rotating about axial axis 112, vibrations in system 100 may be measured using vibration sensor(s) 220. Controller 228 may receive vibration data from vibration sensor(s) 220 and determine whether to adjust an axial compression of bearing damper 176 in order to adjust a stiffness and damping of bearing damper 176 and thereby provide stability to rotation of shaft 168. Controller 228 may send control signals to actuator 188 to move compression ring 192 in a manner to apply a predetermined axial compression (and optionally a radial compression) to bearing damper 176. Controller 228 may monitor the vibration level in system 100 and automatically adjust the axial compression (and optionally a radial compression) of bearing damper 176 such that the vibration level within system 100 is below a threshold. Controller 228 may operate according to the logic shown in FIGS. 10 and 11.

System 100 can be incorporated into a machine. When machinery vibration starts to exceed the machine's vibration level or rate-of-change setpoints, system 100 can automatically modify the bearing support stiffness and damping to lower the vibration and maintain operation and production without having to shut down the machine. The system tolerates fluids and lubricants in the machine and does not require isolation from them to perform. Moreover, the vibration control is achieved without use of fluids, lubrication, electromagnetic forces, or any auxiliary systems to produce the damping force. System 100 provides an automated method of maintaining performance and extending the useful life of the bearing damper through re-compressing of the knitted wire mesh pad(s) in the bearing damper to recover damping. Re-compression of the knitted wire mesh pad(s) can be accomplished while the machine is online.

Figure 13:
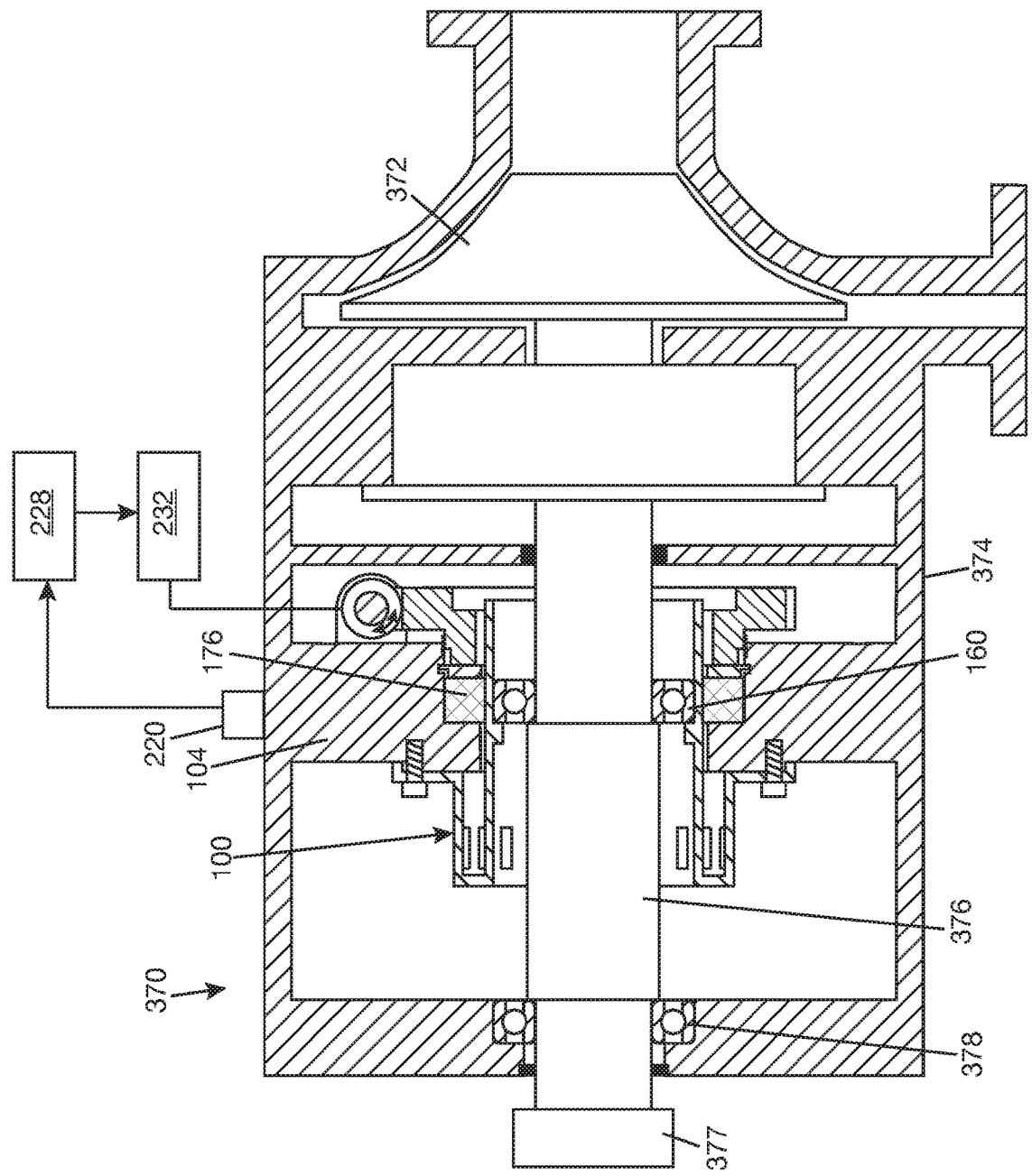
FIG. 13 is a cross-section of a centrifugal pump employing the bearing support system shown in FIG. 1.

FIG. 13 shows one practical application of system 100 in a centrifugal pump 370. Centrifugal pump 370 contains a rotating impeller 372 within a stationary pump casing 374. Shaft 376 is connected at one end to impeller 372. The other end of shaft 376 includes a coupler 377 that can be used to couple shaft 376 to a drive motor (not shown). Shaft 376 is supported by two sets of bearings—bearing 160 that is part of system 100 and another bearing 378 that is mounted in pump casing 374. Bearings 160, 378 are shown as rolling-element bearings. However, any type of bearings may be used with centrifugal pump 370. Bearing housing 104 of system 100 has been integrated with pump casing 374. The version of system 100 shown in FIG. 13 is the one in FIGS. 1 and 2. However, any of the other versions of system 100 shown in FIGS. 6-10 may be used with centrifugal pump 370. Other details of the centrifugal pump are not described herein since centrifugal pumps are well known.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. A system, comprising:
    a bearing housing;
    a bearing disposed within the bearing housing, the bearing to receive and support rotation of a shaft about an axial axis;
    a bearing damper disposed around the bearing, the bearing damper comprising a knitted wire mesh pad having a length in an axial direction that is parallel the axial axis and a wall thickness in a radial direction that is transverse to the axial axis;
    a compression ring positioned to be movable relative to the bearing housing in the axial direction, a movement of the compression ring in the axial direction to apply a compression to the bearing damper resulting in a change in at least one of the length and the wall thickness of the knitted wire mesh pad and a corresponding change in a stiffness and a damping of the bearing damper; and
    an actuator coupled to the compression ring and controllable to move the compression ring in the axial direction in response to mechanical vibrations in an environment of the bearing damper,
    wherein the actuator comprises a worm drive.

2. The system of claim 1, further comprising an anti-rotation ring disposed between the compression ring and the bearing damper and anti-rotatably engaging the bearing housing, and wherein the movement of the compression ring in the axial direction results in a movement of the anti-rotation ring in the axial direction.

3. The system of claim 2, further comprising a structural support coupled to the bearing housing, the structural support having a support wall disposed at least partially within the bearing housing such that an annular space is defined between the support wall and the bearing housing,
    wherein the bearing is disposed at a first side of the support wall,
    wherein the bearing damper is disposed at a second side of the support wall in a first portion of the annular space, and wherein the compression ring is disposed in a second portion of the annular space.

4. The system of claim 3, wherein the compression ring is in threaded engagement with the bearing housing, and wherein the compression ring is movable in the axial direction by adjustment of the threaded engagement.

5. The system of claim 3, further comprising a shoulder formed on at least one of the support wall and the bearing housing, wherein the bearing damper is constrained between the shoulder and the anti-rotation ring.

6. The system of claim 2, further comprising a split wedge ring disposed between the anti-rotation ring and the bearing damper to apply a compression to the bearing damper in the radial direction in response to movement of the compression ring in the axial direction.

7. The system of claim 1, further comprising at least one vibration sensor positioned to sense the mechanical vibrations in the environment of the bearing damper.

8. The system of claim 7, further comprising a controller in communication with the at least one vibration sensor, the controller to receive an output of the at least one vibration sensor and control the actuator to move the compression ring in the axial direction based on the output of the at least one vibration sensor.

9. The system of claim 1, wherein the worm drive comprises a worm gear that is coupled to the compression ring and a worm screw that meshes with the worm gear.

10. The system of claim 1, wherein the knitted wire mesh pad is made of one or more wires, each wire comprising a metal or an alloy.

11. A method, comprising:
providing a bearing within a bearing housing;
disposing a bearing damper around the bearing, the bearing damper comprising a knitted wire mesh pad having a length in an axial direction that is parallel to an axial axis and a wall thickness in a radial direction that is transverse to the axial axis;
receiving and supporting a shaft in the bearing;
rotating the shaft about the axial axis;
measuring vibrations in an environment of the damper during rotation of the shaft; and
applying compression to the bearing damper to adjust at least one of the length and wall thickness of the bearing damper based on the measured vibrations,
wherein applying compression to the bearing damper comprises moving a compression ring relative to the bearing housing in the axial direction,
wherein applying compression to the bearing damper comprises determining an amount by which to adjust at least one of the length and wall thickness of the knitted wire mesh pad based on the measured vibrations.

12. The method of claim 2, wherein applying compression to the bearing damper comprises determining a change in the measured vibrations over a time period and applying the compression if the change in measured vibrations over the time period exceeds a threshold.

13. The method of claim 11, wherein applying compression to the bearing damper comprises determining whether a current measured vibration exceeds a threshold and applying the compression if the current measured vibration exceeds the threshold.

14. The method of claim 11, wherein moving the compression ring relative to the bearing housing in the axial direction comprises controlling an actuator to move the compression ring in the axial direction.

15. The method of claim 11, wherein applying compression to the bearing damper based on the measured vibrations comprises transferring movement of the compression ring in the axial direction to an anti-rotation ring that is in abutting relation with the knitted wire mesh pad.

16. The method of claim 11, wherein applying compression to the bearing damper based on the measured vibrations comprises applying compression to the knitted wire mesh pad along the axial direction and the radial direction.

* * * * *